(No Model.)
S. AYRES.
LOCK FOR TRAPS.
No. 331,223.   Patented Nov. 24, 1885.
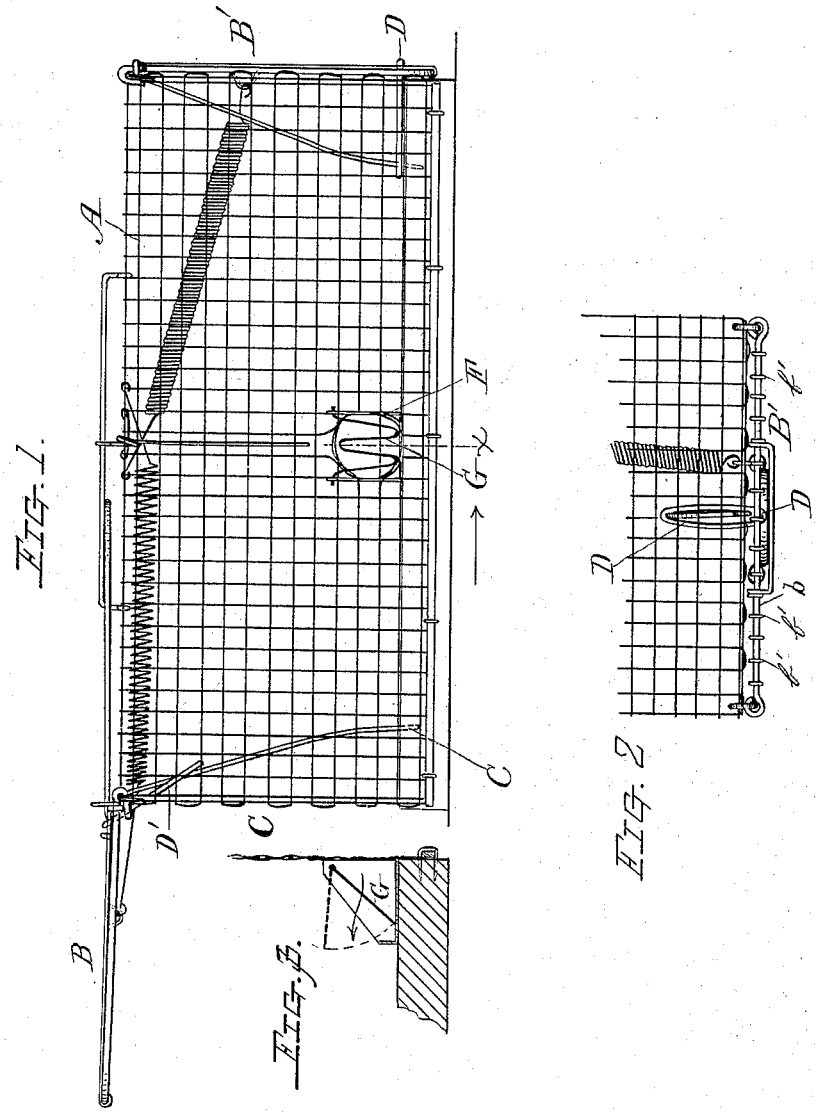

UNITED STATES PATENT OFFICE.

SAMUEL AYRES, OF WORCESTER, MASSACHUSETTS, ASSIGNOR TO THE AYRES MANUFACTURING COMPANY, OF SAME PLACE.

LOCK FOR TRAPS.

SPECIFICATION forming part of Letters Patent No. 331,223, dated November 24, 1885.

Application filed November 17, 1884. Serial No. 148,159. (No model.)

*To all whom it may concern:*

Be it known that I, SAMUEL AYRES, of the city and county of Worcester, State of Massachusetts, have invented an Improvement in Locks for Traps and Similar Purposes, of which the following is a specification.

This invention relates to the securing the door or gate through which the animal has entered and sprung the trap, to prevent its escape by pressing open the gate. Its nature is fully shown in the following description and accompanying drawings of a trap with my invention embodied therein.

In said drawings, Figure 1 is a side view, showing one gate open and one closed, of a common form of trap. Fig. 2 is a plan of one end, showing the gate closed and locked; and Fig. 3 shows a section of the side entrance and adjacent parts at the line $x$, Fig. 1.

My invention is specially adapted to traps having gates or doors that swing at the top, as shown, though applicable to others with slight modification.

A is the body of the trap; B B', the gates, which are made of a frame of wire, $b$, Fig. 2, with perpendicular bars or slats $b'$. About the middle of the mouth of the trap, and inside, is placed the locking-standard C, fastened at its bottom and sloping as it nears the top, where it is secured near the hinge of the gate, as shown in Fig. 1. The locking link or ring D is made long enough to embrace the standard C and one of the bars of the gate, as in Figs. 1 and 2, while by lifting the link, as at D', the gate can be opened and the trap set.

In the form of trap shown it is usual to set both gates at once, so the animal sees a passage through. The closing of the gates allows the links D to fall to the bottom, automatically locking them securely, so that they cannot be opened without raising the link.

At F a small side entrance is shown with a self-closing guard, G, or gate, a section of the same being as in Fig. 3.

I am aware that it is not new to provide the hinged door of a trap with a locking-link which travels on one of the vertical bars of the cage, and a vertical bar secured to the door; but with this construction it is necessary to make the link loose or large enough to fall freely without catching, for which reason it cannot lock the door tight. I avoid this objection by sloping my standard, and thus can use a link that will be tight at or near the bottom, and at the top sufficiently loose to allow the door to be opened, and to fall freely when it is closed until the slope of the standard causes it to lock the door tight.

What I claim as new, and desire to secure by Letters Patent, is—

In an animal-trap, the combination, with the hinged gate, of the locking-link and sloping locking-standard, constructed and operating substantially as and for the purposes described.

SAML. AYRES.

Witnesses:
 C. H. ARNOLD,
 JAS. GREENE.